United States Patent
Fevre

(10) Patent No.: US 7,685,933 B2
(45) Date of Patent: Mar. 30, 2010

(54) MULTI-SPEED FOOD PROCESSING DEVICE WITH ELECTRICAL MOTOR

(75) Inventor: Loïc Xavier Fevre, Sanvignes les Mines (FR)

(73) Assignee: Hameur S.A., Luxembourg (LU)

( * ) Notice: Subject to any disclaimer, the term of this patent is extended or adjusted under 35 U.S.C. 154(b) by 945 days.

(21) Appl. No.: 11/474,129

(22) Filed: Jun. 23, 2006

(65) Prior Publication Data
US 2007/0006739 A1    Jan. 11, 2007

(30) Foreign Application Priority Data
Jun. 24, 2005    (FR) .................................. 05 51754

(51) Int. Cl.
*A47J 43/04* (2006.01)
*A47J 37/00* (2006.01)
*A23L 1/20* (2006.01)

(52) U.S. Cl. ................. 99/348; 99/510; 241/101.8; 366/197; 366/294

(58) Field of Classification Search .......... 99/348, 99/510, 511, 512, 513; 241/101.01, 101.6, 241/101.8; 366/197, 199, 294, 299
See application file for complete search history.

(56) References Cited
U.S. PATENT DOCUMENTS

| | | | | |
|---|---|---|---|---|
| 4,089,367 A | * | 5/1978 | Wietzel et al. | 165/61 |
| 5,074,201 A | * | 12/1991 | Takeyama et al. | 99/483 |
| 5,447,371 A | * | 9/1995 | Agapiou | 366/290 |
| 6,318,247 B1 | * | 11/2001 | Di Nunzio et al. | 99/348 |
| 7,395,751 B2 | * | 7/2008 | Liu | 99/348 |

FOREIGN PATENT DOCUMENTS

| | | |
|---|---|---|
| DE | 3544304 A1 | 6/1987 |
| EP | 0570685 A | 11/1993 |

* cited by examiner

*Primary Examiner*—Reginald L Alexander
(74) *Attorney, Agent, or Firm*—Patterson, Thuente, Skaar & Christensen, P.A.

(57) ABSTRACT

A food processing device having a motor shaft of a motor from the device coupled to the tool carrying shaft for multi-speed operation. The tool carrying shaft and the motor shaft are connected by two distinct trains, continuously driven, each train comprising one free wheel, mounted with relation to the free wheel of the other train in such a way that power from the motor is only transmitted to the tool carrying shaft by the relevant train in a single direction of rotation of the motor and that for the other direction of rotation of said motor, the power is only transmitted to the tool carrying shaft by the other train.

11 Claims, 4 Drawing Sheets

MULTI-SPEED FOOD PROCESSING DEVICE WITH ELECTRICAL MOTOR

RELATED APPLICATION

This application claims priority to French Application No. FR 05 51754 filed Jun. 24, 2005.

1. Technical Field

The present invention relates to food cutters. In particular, it relates to a food cutter having a multi-directional and multi-speed cutting tool.

2. Background of the Invention

The object of the present invention is a food processing device with a turning tool comprising an electrical power unit to which is associated a bowl closed with a lid, the tool being driven in rotation inside the bowl by a through-shaft, in direct or indirect connection with the motor.

These apparatuses, well known in the field, are called cutters and vegetable cutters or combined cutters/vegetable cutters for those that combine the functions of the first two, and are mainly utilized for cutting, grating, shredding, mixing, emulsifying, kneading and chopping functions for raw or cooked foods of highly varied types.

The cutting functions themselves are numerous whether they be, for example, cutting meat or vegetables, cutting slices, cubes, sticks or even strings, and therefore the necessary cutting tool shape, rotation speed and torque will be very different.

Small-capacity apparatuses are particularly utilized in the field of small commercial restaurants and it is then commercially desirable, or even necessary in the case of certain countries, that these apparatuses be powered from a monophase electrical outlet, which unlike a triphase source, is present in all establishments and has the advantage of less expensive installation and operation.

Various electrical motorization solutions exist for these apparatuses, from the simplest in which the motor, generally a monophase asynchronous motor, electrically powered in-line on the network, mechanically drives the tool in-line, to more elaborate solutions such as those that consist of, for example, powering the asynchronous type motor with a variable frequency power electronic device that allows its speed to be continuously varied, which is transmitted to the tool in-line or through a gear reducer to increase the torque at the tool.

Other solutions utilize a dual-speed triphase asynchronous motor, electrically powered in-line on the network via a connecting device to obtain one speed or the other, which drives the tool in-line or through a gear reducer to increase the torque.

The simplest solution with a monophase, one-speed asynchronous motor that is electrically and mechanically in-line, has the advantages of simplicity, reliability and low cost but presents the major disadvantage of only offering a single tool rotation speed; therefore, the solution only allows a limited number of functions.

For a particular type of apparatus, a 2-pole asynchronous monophase motor is preferentially chosen, whose high speed is well adapted for certain chopping or emulsifying functions but does not allow, for example, kneading to be performed since the torque is insufficient. For the same reason, it is generally impossible to cut hard vegetables into cubes or fries by the usual process that combines a disk that first cuts a slice and then presses the slice through a grate. Cutting fragile vegetables is also considered impossible since the too-high speed leads to these products being damaged.

In the same manner, for another type of apparatus, a 4-pole asynchronous monophase motor is preferentially chosen whose intermediate speed is well adapted for common cutting and kneading functions. Again, some functions, such as cutting hard vegetables into cubes or fries is generally impossible since the torque is still too low and the speed is still too high to guarantee a regular slice thickness.

Monophase asynchronous motors with higher polarity have a lower speed and generally a higher torque in the same space. They may be utilized for cutting hard vegetables into cubes but in practice they present the disadvantage of lower yield and, depending on the usage of the apparatus, problems with cooling occur.

Therefore to motorize apparatuses that perform this latter type of cutting, generally in-line driving of the tool by the motor is abandoned in favor of a solution that adds a one-speed monophase asynchronous motor, a speed reducing device, with gears or belts for example, that provides a relatively low and suitable speed to the tool and furthermore increases the torque, which is necessary for performing these functions.

However, this type of motorization presents the disadvantage of an additional cost connected to the speed reducing device and, above all, no longer allows conventional cutting and kneading functions to be performed since this time the tool speed is too low.

Another motorization solution generally resorts to a dual-speed triphase asynchronous motor that drives the tool in-line, whose high speed is utilized for common cutting and kneading functions and whose low speed is utilized for cutting hard vegetables into cubes.

This solution is satisfactory in terms of reliability but presents the major disadvantage of needing a triphase electrical outlet, which is prohibitive for its marketing in certain markets, particularly in all English-speaking markets where the users of these types of apparatuses generally do not have triphase electrical installations available. In addition, preferably one resorts to a particular construction of the coil winding of the motor, known under the name Dahlander connection, in which the coil assembly is utilized for each of the two speeds and which presents the advantage, with relation to the solution with two separate coils, one by polarity, of a larger weight-power ratio or even a higher yield. The two speeds are then in the 1 to 2 ratio, and this technical constraint does not allow an ideal compromise on the functional plan since the ratio between the two best adapted speeds is situated by experience between one third and one fourth. This solution therefore constitutes an acceptable compromise without being fully satisfactory and, besides, is not commercially operational in many countries.

More elaborate motorization solutions that utilize an asynchronous motor powered by a variable frequency power electronic device, itself powered from a monophase outlet, allow the tool to be provided, either directly or via a mechanical speed reducing device, with several speeds and generally a continuous range of speeds, which speeds provide the apparatus with the capability to achieve all types of functions, for which the tool as well as the other cutting accessories are adapted. This type of solution is ideal on the functional plan but presents, with relation to the other simpler solutions that do not have recourse to power electronics, both the disadvantage of lower reliability and a much higher cost, combined with the additional difficulty of finding variable frequency power electronic devices on the market whose electrical power may be performed at monophase alternating voltage from 100 to 120 volts as is necessary, for example, in Japan, the United States of America, Canada and even in Latin America.

SUMMARY OF THE INVENTION

The object of the present invention is to provide a solution to this problem.

More precisely, the invention relates to a turning tool food processing apparatus comprising an electrical power unit to which is associated a bowl closed by a lid, the tool being driven in rotation inside the bowl by a through-shaft shaft, characterized in that the transmission of power between the motor shaft, also called the output shaft, and the clutch shaft that carries the tool, also called the support shaft, is done by a mechanical device that allows the number of rotation speeds of the motor to be doubled, also characterized in that the motor is designed to turn in two directions of rotation, one direction of rotation providing the tool carrying shaft with a first speed of rotation, the other direction providing the second speed of rotation, also characterized in that the ratios between the rotation speed of the motor and the rotation speeds of the tool carrying shaft may be freely and independently set from each other by construction.

According to the invention, the tool carrying shaft and the motor shaft are connected by two distinct trains, also called coupling sub-devices, continuously driven, characterized in that each train comprises one free wheel, mounted with relation to the free wheel of the other train in such a way that power from the motor is only transmitted to the tool carrying shaft by the relevant train in a single direction of rotation of the motor and that for the other direction of rotation of said motor, the power is only transmitted to the tool carrying shaft by the other train.

In this document, the free wheels are considered to be directional couplings, which may transmit a moment by friction in one direction by allowing no-load running in the other direction.

In this document the coupling ratio of a coupling sub-device is also considered to be the ratio between the speed of rotation of the tool carrying shaft to the speed of rotation of the motor shaft when the power is transmitted between the two shafts by the relevant coupling sub-device.

According to the invention, it is possible, by choice, to design the two power transmission trains between the motor shaft and the tool carrying shaft in such a way that for the two directions of rotation of the motor, the tool carrying shaft rotates in an opposite direction, or on the contrary, in the same direction.

According to the invention, it is possible to utilize a dual-speed motor, generally in the ratio of one in relation to the other, from 1 of 2, which motor, capable of rotating at both of these speeds, in one and the other direction of rotation, allows the speed reducing ratio of the two trains to be selected to provide well-staggered speeds to the tool carrying shaft 4.

The first advantage of the invention is to obtain, from a one-speed motor, which may therefore be preferentially chosen from the monophase asynchronous type, two speeds of rotation for the tool carrying shaft wherein their motor speed ratios may be fixed freely during construction. Therefore one may, for example, choose a 4-pole motor and adopt a 1-1 ratio for the fast speed train and a 1-3 to 1-4 ratio for the slow speed train and therefore obtain two speeds at the cutting tool, the first mainly reserved for common cutting and kneading functions, the second utilized in particular for cutting hard vegetables into cubes, which comprises an excellent compromise on the functional plan.

Another advantage of these provisions associated with a monophase asynchronous motor is that it is possible to construct a well-adapted apparatus on the functional plan for utilization on all monophase networks in the world, particularly those in Japan with 100 volts, or even those in the United States, Canada or Latin America with 120 volts, inasmuch as this type of motor is very popular and also very widely used in the field of the invention.

When for the invention, a monophase asynchronous motor is chosen for use, another advantage resides in the very simple manner on the electrical plan of reversing the direction of rotation of the motor and therefore choosing one speed or the other for the tool, since it is then sufficient for example, to electrically reverse the direction of current that flows through the auxiliary coil winding of the motor, an operation that is obtained, for example, by the utilization of a simple two contact inverter relay. This characteristic easily allows, if necessary, the speed selection to be made automatic according to the nature of the cutting accessory installed on the apparatus, as far as the latter is equipped with an identification device such as, for example, one or more magnets that act on one or more magnetic interrupters, wherein the open or closed state will then be determined by the control device of the motor to select the direction of rotation of the motor and consequently the speed of the tool adapted for this accessory.

Therefore, the object of the invention is a device for processing food comprising a motor shaft, said device also comprising a tool carrying shaft to drive various cutting tools, characterized in that the motor is able to turn in two directions of rotation and in that the power of the motor is transmitted from the motor shaft to the tool carrying shaft by a coupling device comprising two coupling sub-devices, each comprising at least one wheel mounted on one of the shafts via one free wheel, one of the coupling sub-devices then transmitting the torque from the motor according to the direction of rotation of the latter, the coupling sub-devices having different coupling ratios, the tool carrying shaft then having a different speed of rotation depending on the direction of rotation of the motor.

Advantageously, the invention is also characterized in that at least one of the coupling sub-devices comprises toothed wheels for coupling the motor shaft and the tool carrying shaft.

Advantageously, the invention is also characterized in that at least one of the coupling sub-devices comprises a belt drive for coupling the motor shaft and the tool carrying shaft.

Advantageously, the invention is also characterized in that the belt is an elastic type belt.

Advantageously, the invention is also characterized in that one of the coupling sub-devices comprises a loose wheel in the coupling train, therefore allowing the tool carrying shaft to always turn in the same direction whatever the direction of rotation of the motor shaft.

Advantageously, the invention is also characterized in that the electric motor is the one-speed asynchronous type electric motor.

Advantageously, the invention is also characterized in that the electric motor is the dual-speed asynchronous type electric motor.

Advantageously, the invention is also characterized in that the coupling ratio of the two coupling sub-devices has a ratio between them that is roughly in the interval [3 . . . 4].

Advantageously, the invention is also characterized in that the selection of the speed of rotation of the tool carrying shaft is manual.

Advantageously, the invention is also characterized in that the selection of the speed of rotation of the tool carrying shaft is automatic.

Advantageously, the invention is also characterized in that the free wheels are mounted on the tool carrying shaft.

Advantageously, the invention is also characterized in that the belt is an elastic type belt.

BRIEF DESCRIPTION OF THE DRAWINGS

The invention will be better understood upon reading the following description and examining the accompanying figures. The figures are presented for indication purposes only and in no way limit the invention. The figures show.

DETAILED DESCRIPTION OF THE DRAWINGS

Figure 1:
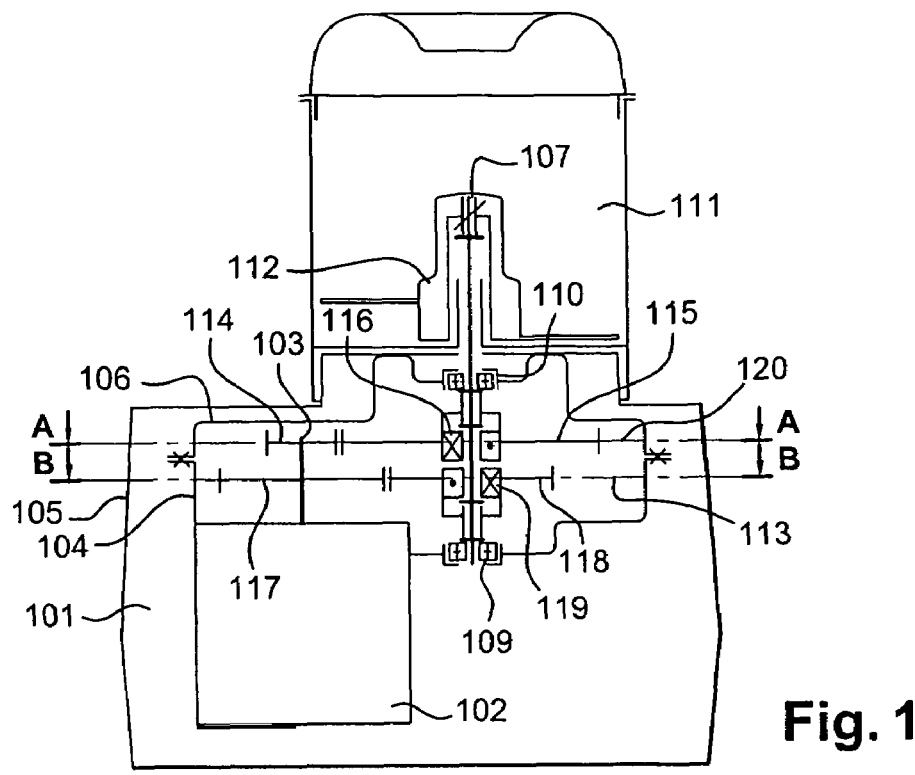
FIG. 1: a sectional simplified diagram in lateral view of a particular coupling device between the motor shaft and the tool carrying shaft according to the invention for which two speeds of the tool carrying shaft are obtained in the opposite directions from each other.

FIG. 1 is a kinematic diagram of a first variation of the invention illustrating the parts of a food-processing device directly involved in the invention.

FIG. 1 shows a device 101 for processing food comprising a motor 102 comprising a motor shaft 103. In the example chosen, the shaft 103 is vertical. The motor 102 is fixed to a lower part 104 of a chassis itself fixed to a frame 105 of the device 101. Said chassis also comprises an upper part 106. Parts 104 and 106 form the chassis 108 comprising two coupling sub-devices. A coupling sub-device is also known by the name power transmission train.

The device 101 also comprises a tool carrying shaft 107 parallel to the shaft 103. The shaft 107 is fixed to the chassis 108 by two bearings, respectively 109 and 110, themselves fixed respectively to parts 104 and 106. The shafts 103 and 107 are coupled by two coupling sub-devices.

Shaft 107 is accessible from the outside of the device 101, from the inside of a bowl 111 fixed to device 101. At its extremity seen from the outside of the device 101, the shaft 107 comprises means to support and drive a food processing tool 112. Typically the device 101 is an apparatus known in the field by the combined name cutter/vegetable-cutter and for which only the cutter accessory is diagrammed.

FIG. 1 shows that the chassis 108 comprises two coupling sub-devices respectively 120 and 113 distributed in respective planes A-A and B-B perpendicular to shafts 103 and 107.

Plane A-A comprises a small-diameter toothed wheel 114 rigidly fixed to shaft 103. Plane A-A also comprises a large-diameter toothed wheel 115 fixed to shaft 107 via a free wheel 116. The wheel 114 engages the coupling wheel 115 as well as the shafts 103 and 107 in one of the directions of rotation of the shaft 103. This direction of rotation is dependent on the free wheel 116. In our example, the free wheel 116 is considered to allow the no-load running in the trigonometric direction. That is, that when the wheel 115 rotates in the trigonometric direction, it does not drive shaft 107.

In our example, the diameter of wheel 114 is less than the diameter of wheel 115.

Plane B-B comprises a toothed wheel 117 rigidly fixed to shaft 103. Plane B-B also comprises a toothed wheel 118 fixed to shaft 107 via a free wheel 119. Wheel 117 engages wheel 118 thus coupling shafts 103 and 107 in a direction of rotation of shaft 103. This direction of rotation is dependent on free wheel 119. In our example, free wheel 119 is considered to be free in the clockwise direction. That is, that when the wheel 118 rotates in the clockwise direction, it does not drive shaft 107.

In our example, wheels 117 and 118 have the same diameter.

In the variation of the invention corresponding to FIG. 1, free wheels 116 and 119 are both fixed on the tool carrying shaft 107. Still with this variation, free wheels 116 and 119 do not allow no-load running in the same direction of rotation, allowing selection of the coupling sub-device by the direction of rotation of the shaft 103.

A first coupling sub-device is comprised of wheels 114 and 115, a second coupling sub-device being comprised of wheels 117 and 118.

In a preferred variation of the invention, the coupling ratio between the first and second sub-devices is in the interval [3 . . . 4]. Inasmuch as wheels 117 and 118 have the same diameter (1/1 coupling), this means that the ratio of the diameter of wheels 115 and 114 is in the interval [3 . . . 4]. These remarks are also valid later.

Figures 1A, 1B:
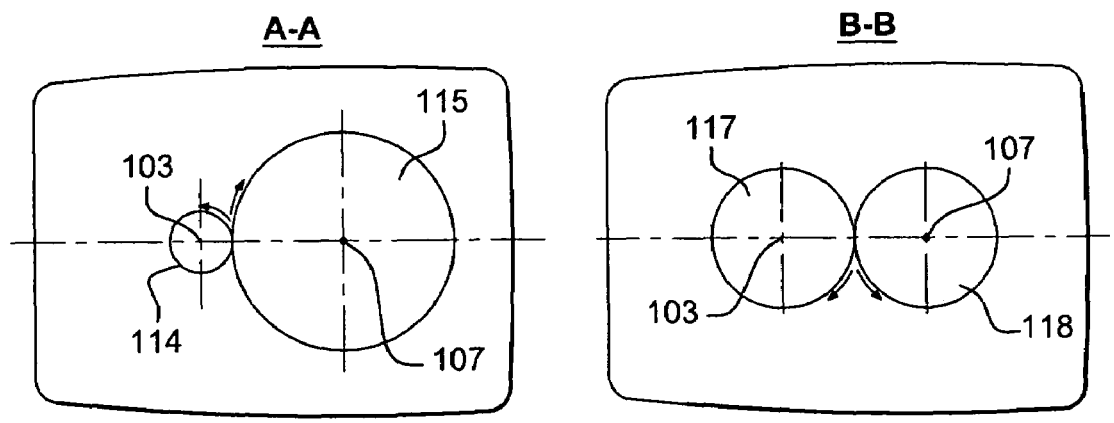
FIG. 1a: a top view of a first gear plane.
FIG. 1b: a top view of a second gear plane.

FIG. 1a illustrates the fact that when shaft 103 rotates in the trigonometric direction, then the first coupling sub-device drives the shaft 107 clockwise.

FIG. 1a illustrates the fact that when shaft 103 rotates in the clockwise direction, then the second coupling sub-device drives the shaft 107 in the trigonometric direction.

In this first variation of the invention, the direction of rotation of the tool carrying shaft 107 changes according to the direction of rotation of the motor shaft 103.

In a variation of the invention, the free wheels are on the motor shaft 103.

In another variation of the invention, each of the free wheels is on a distinct shaft. It is understood that each sub-device comprises a single free wheel allowing no-load rotation of a wheel with relation to the shaft that carries the wheel.

In practice, placing at least the free wheel of the sub-device having the highest coupling ratio on the tool carrying shaft is preferred since when it runs with no load it undergoes a relatively slower speed of rotation and therefore has much less wear.

In still another variation, one of the coupling sub-devices comprises in its coupling train an intermediate toothed wheel that allows the direction of rotation to be maintained between its input wheel and its output wheel, and the two free wheels 116 and 119 are then mounted in such a way as to allow no-load running in the same direction of rotation. This variation allows the tool carrying shaft 107 to rotate in the same direction whatever the direction of rotation of the motor shaft 103.

Figure 2:
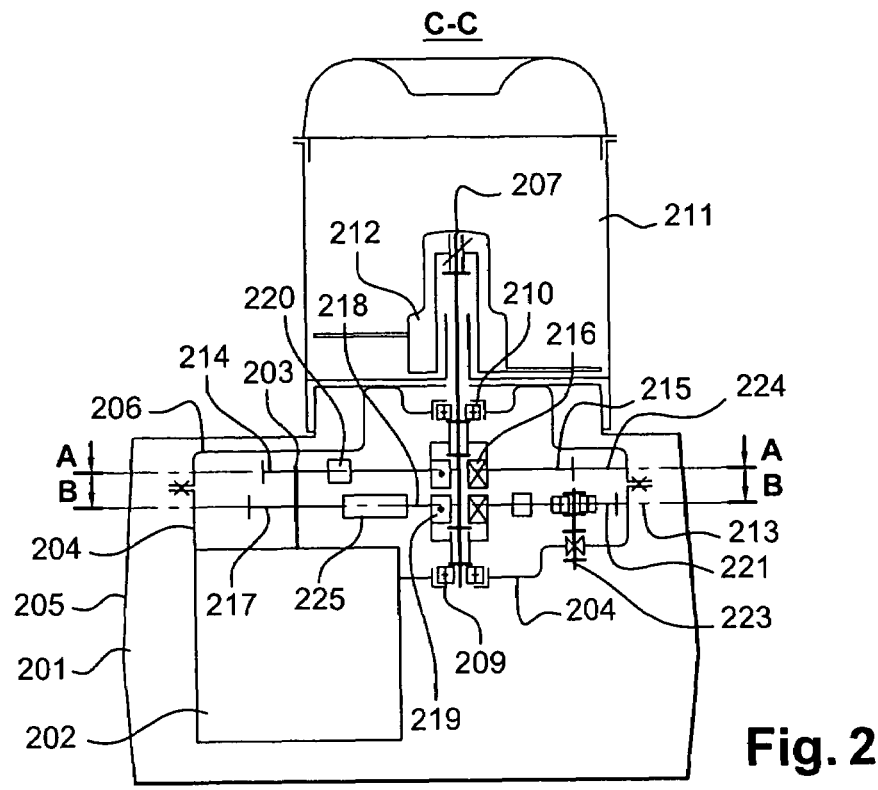
FIG. 2: a sectional simplified diagram in lateral view of a particular coupling device between the motor shaft and the tool carrying shaft according to the invention for which the two speeds of the tool carrying shaft are obtained in the same direction of rotation.

FIG. 2 is a kinematic diagram of a second variation of the invention illustrating the parts of a food-processing device directly involved in the invention.

FIG. 2 shows a device 201 for processing food comprising a motor 202 comprising a motor shaft 203. In the example chosen, the shaft 203 is vertical. The motor 202 is fixed to a lower part 204 of a chassis itself fixed to a frame 205 of the device 201. Said chassis also comprises an upper part 206. Parts 204 and 206 form the chassis 208 comprising two coupling sub-devices.

The device 201 also comprises a tool carrying shaft 207 parallel to the shaft 203. The shaft 207 is fixed to the chassis 208 by two bearings, respectively 209 and 210, themselves fixed respectively to parts 204 and 206. The shafts 203 and 207 are coupled by two coupling sub-devices.

Shaft 207 is accessible from the outside of the device 201, from the inside of a bowl 211 fixed to device 201. At is extremity seen from the outside of the device 201, the shaft 207 comprises means to support and drive a food processing tool 212. Typically the device 201 is an apparatus known in the field by the combined name cutter/vegetable-cutter and for which only the cutter accessory is diagrammed.

FIG. 2 shows that the chassis 208 comprises two coupling sub-devices respectively 224 and 213 distributed in respective planes A-A and B-B perpendicular to shafts 203 and 207.

Plane A-A comprises a small-diameter wheel 214 rigidly fixed to shaft 203. Plane A-A also comprises a large-diameter wheel 215 fixed to shaft 207 via a free wheel 216. The wheel 214 drives, via a belt 220, the wheel 215 thus coupling shafts 203 and 207 in a direction of rotation of shaft 203. This direction of rotation is dependent on the free wheel 216. In our example, the free wheel 216 is considered to allow no-load running in the clockwise direction. That is, that when the wheel 215 rotates in the clockwise direction, it does not drive shaft 207.

In our example, the diameter of wheel 214 is less than the diameter of wheel 215.

Plane B-B comprises a wheel 217 rigidly fixed to wheel 203. Plane B-B also comprises a wheel 218 fixed to shaft 207 via a free wheel 219. Plane B-B also comprises two loose wheels respectively 221 and 222, fixed respectively on shafts 223 and 224 via bearings. Shafts 223 and 224 are parallel to shaft 203. Shafts 223 and 224 are situated in a plane perpendicular to plane P1 formed by shafts 203 and 207. Shafts 223 and 224 are situated on both sides of plane P1 and opposite from shaft 203 with relation to shaft 207. Shafts 223 and 224 are fixed to part 204 of chassis 208. Wheel 217 drives wheel 218 in the opposite direction, via a current belt 225 on wheels 217, 221, 218 and 222, therefore coupling shafts 203 and 207 in a direction of rotation of the shaft 203. This direction of rotation is dependent on the free wheel 219. In our example, the free wheel 219 is considered to allow no-load running in the clockwise direction. That is, that when the wheel 218 rotates in the clockwise direction, it does not drive shaft 207.

In our example, wheels 217 and 219 have the same diameter.

In the variation of the invention corresponding to FIG. 2, free wheels 216 and 219 are both fixed on the tool carrying shaft 207. Still in this variation, free wheels 216 and 219 allow no-load running in the same direction of rotation, allowing in conjunction with the reversal of the direction of rotation between wheels 217 and 218, a selection of the coupling sub-device by the direction of rotation of shaft 203.

A first coupling sub-device is comprised of wheels 214 and 215, as well as belt 220, a second coupling sub-device being comprised of wheels 217, 221, 218 and 222 and of belt 225.

In a preferred variation of the invention, the coupling ratio of the first and second sub-devices have a ratio between them in the interval [3 . . . 4].

In this second variation also, the free wheels may be distributed on shafts 203 and 207.

Figure 2A:
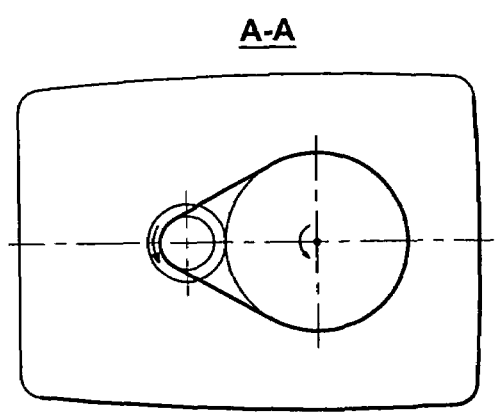
FIG. 2a: a top view of a first belt plane.

FIG. 2a illustrates the fact that when shaft 203 rotates in the trigonometric direction, then the first coupling sub-device drives the shaft 207 in the trigonometric direction.

Figure 2B:
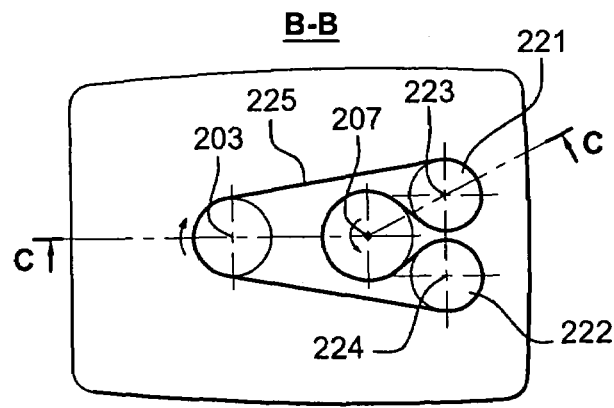
FIG. 2b: a top view of a second belt plane.

FIG. 2b illustrates the fact that when shaft 203 rotates in the clockwise direction, then the second coupling sub-device drives the shaft 207 in the trigonometric direction.

Figure 3:
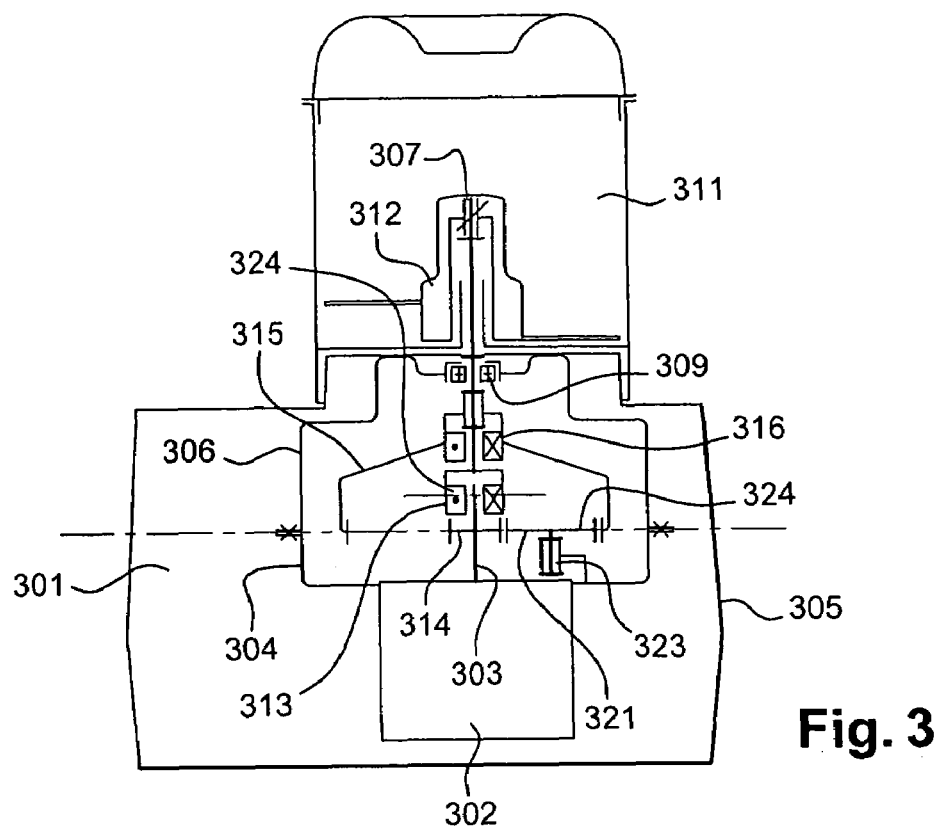
FIG. 3: a sectional simplified diagram in lateral view of a particular coupling device between the motor shaft and the tool carrying shaft according to the invention for which the two speeds of the tool carrying shaft are obtained in the same direction of rotation.

FIG. 3 is a kinematic diagram of a third variation of the invention illustrating the parts of a food-processing device directly involved in the invention.

FIG. 3 shows a device 301 for processing food comprising a motor 302 comprising a motor shaft 303. In the example chosen, the shaft 303 is vertical. The motor 302 is fixed to a lower part 304 of a chassis itself fixed to a frame 305 of the device 301. Said chassis also comprises an upper part 306. Parts 304 and 306 form the chassis 308 comprising two coupling sub-devices devices.

The device 301 also comprises a tool carrying shaft 307 collinear to the shaft 303. The shaft 307 is connected to the chassis 308 by two bearings 309 and 309, themselves fixed to part 306. The shafts 303 and 307 are coupled by two coupling sub-devices.

Shaft 307 is accessible from the outside of the device 301, from the inside of a bowl 311 fixed to device 301. At is extremity seen from the outside of the device 301, the shaft 307 comprises means to support and drive a food processing tool 312. Typically the device 301 is an apparatus known in the field by the combined name cutter/vegetable-cutter and for which only the cutter accessory is diagrammed.

FIG. 3 shows that the chassis 308 comprises two coupling sub-devices respectively 324 and 313 distributed in a plane A-A perpendicular to shafts 303 and 307.

Plane A-A comprises a small-diameter toothed wheel 314 rigidly fixed to shaft 303. Plane A-A also comprises a toothed wheel 321 rigidly fixed to shaft 323. Shaft 323 is connected by a pin to part 304. FIG. 3 also shows a bell-shaped wheel 315 connected to shaft 307 by a free wheel 316. Wheel 315 is such that it comprises teeth on an inner ring gear in such a way as to engage the wheel 321 that itself engages wheel 314. A coupling is therefore made between shafts 303 and 307 in one direction of rotation of the shaft 303. This direction of rotation is dependent on the free wheel 316. In our example, the free wheel 316 is considered to allow no-load running in the clockwise direction. That is, that when the wheel 315 rotates in the clockwise direction, it does not drive shaft 307.

Elements 314, 321 and 315 form a first coupling sub-device.

FIG. 3 shows that shaft 307 is coupled directly to shaft 303 via a free wheel 324 that allows no-load running in the same direction as free wheel 316, here in the clockwise direction. Free wheel 324 is situated inside the bell formed by wheel 315.

Free wheel 324 forms the second coupling sub-device.

In this variation, wheel 321 plays the role of an intermediate wheel in the coupling train allowing the tool carrying shaft 307, in conjunction with the free wheels 316 and 324, to rotate in the same direction whatever the direction of rotation of the motor shaft 303.

Figure 4:
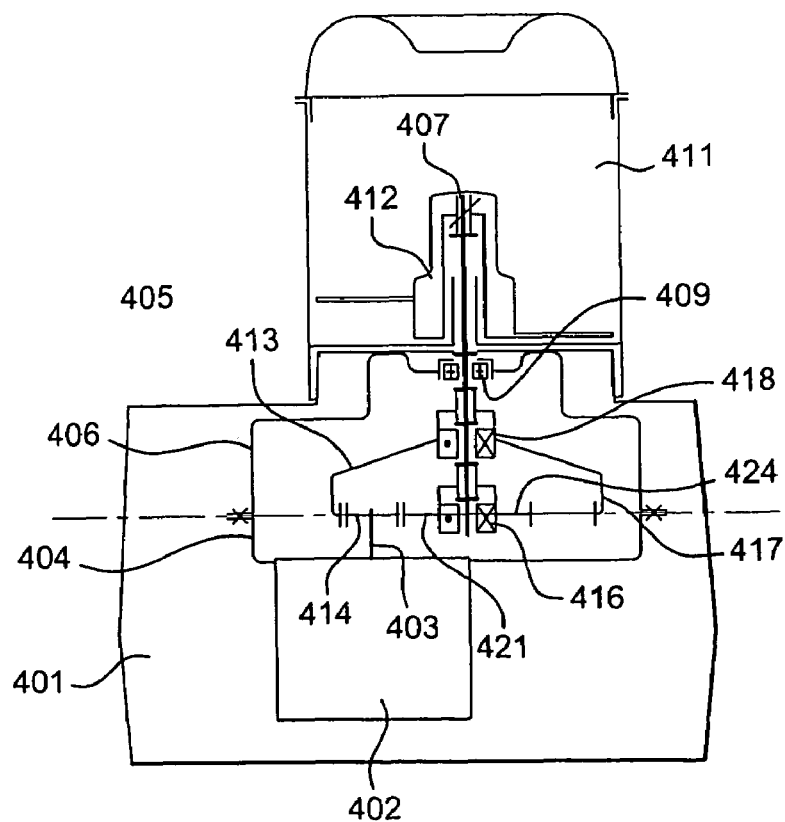
FIG. 4: a sectional simplified diagram in lateral view of a particular coupling device between the motor shaft and the tool carrying shaft according to the invention for which the two speeds of the tool carrying shaft are obtained in the same direction of rotation.

FIG. 4 is a kinematic diagram of a fourth variation of the invention illustrating the parts of a food-processing device directly involved in the invention.

FIG. 4 shows a device 401 for processing food comprising a motor 402 comprising a motor shaft 403. In the example chosen, the shaft 403 is vertical. The motor 403 is fixed to a lower part 404 of a chassis itself fixed to a frame 405 of the device 401. Said chassis also comprises an upper part 406. Parts 404 and 406 form the chassis 408 comprising two coupling sub-devices.

The device 401 also comprises a tool carrying shaft 407 parallel to the shaft 403. The shaft 407 is connected to the chassis 408 by two bearings 409 and 410, themselves fixed to part 406. The shafts 403 and 407 are coupled by two coupling sub-devices.

Shaft 407 is accessible from the outside of the device 401, from the inside of a bowl 411 fixed to device 401. At is extremity seen from the outside of the device 401, the shaft 407 comprises means to support and drive a food processing tool 412. Typically the device 401 is an apparatus known in the field by the combined name cutter/vegetable-cutter and for which only the cutter accessory is diagrammed.

FIG. 4 shows that the chassis 408 comprises two coupling sub-devices respectively 424 and 413 distributed in a plane A-A perpendicular to shafts 403 and 407.

Plane A-A comprises a small-diameter toothed wheel 414, rigidly fixed to shaft 403. Plane A-A also comprises a toothed wheel 421 fixed to shaft 407 via a free wheel 416. The free wheel 416 allows no-load running in the clockwise direction. Wheel 414 drives wheel 421 in the opposite direction, forming a first coupling sub-device between shaft 403 and shaft 407.

FIG. 4 also shows that wheel 414 engages the lower part of bell-shaped wheel 417. Wheel 414 drives wheel 417 in the same direction as itself; wheel 417 is connected to shaft 407 via a free wheel 418, which also allows no-load running in the clockwise direction. Wheels 414 and 417 form a second coupling sub-device. Wheel 421 is inside the bell formed by wheel 417.

Still in this variation, the direction of rotation of shaft 407 is not dependent on the direction of rotation of the motor shaft 403.

In all the variations presented, the speed of rotation of the tool carrying shaft depends on the direction of rotation of the motor shaft. The person skilled in the art may simply deduce other embodiments of the invention from the numerous variations presented.

Each variation of the invention described utilizes a rotating motor comprising a motor shaft, said motor being able to rotate in the two directions of rotation that are the clockwise direction and the trigonometric direction. Such motors are, for example, a one-speed asynchronous electrical motor or a dual-speed asynchronous electrical motor. A one-speed motor utilized with the invention allows two speeds of rotation to be obtained for the tool carrying shaft, according to the direction of rotation of the one-speed motor. A dual-speed motor utilized with the invention allows four speeds of rotation to be obtained for the tool carrying shaft, according to the direction of rotation and the speed of rotation of the dual-speed motor. Other types of motors are obviously usable in the context of the embodiment of the invention, as far as it is possible to reverse their direction of rotation. One may cite, for example, universal motors or series wound motors, direct-current motors, brush less motors, or even variable reluctance motors. More generally, the invention may be embodied with a variable speed motor, the two coupling sub-devices then principally offering the interest of a torque multiplier transmission ratio for example between the motor shaft and the tool carrying shaft according to the direction of rotation of the motor.

In an embodiment of the invention, free wheels combining a rigid bearing with at least one row of ball bearings. Such free wheels offer high compactness, excellent true running of the free wheel function with the guiding in rotation function since both are integrated in the same precision component, great ease of mounting and a reduction in the number of components. Furthermore, this choice reduces the requirements of hardness and surface texture on the shaft or shafts bearing the free wheels since these qualities are precisely provided by the inner and outer rings of this type of free wheel.

For the variations of the invention embodying at least one coupling per belt, elastic type belts are used with fixed center distances. This presents the following advantages: operationally, belts are much quieter than with gears, freedom of choice of the ratios between the speeds of the tool carrying shaft and that or those of the motor shaft, no need for lubrication or adjustment, lower geometric quality requirements than with gears, with center distances for example, construction with fixed center distances that reduces the number of components, which leads to a more economical construction.

Figure 5:
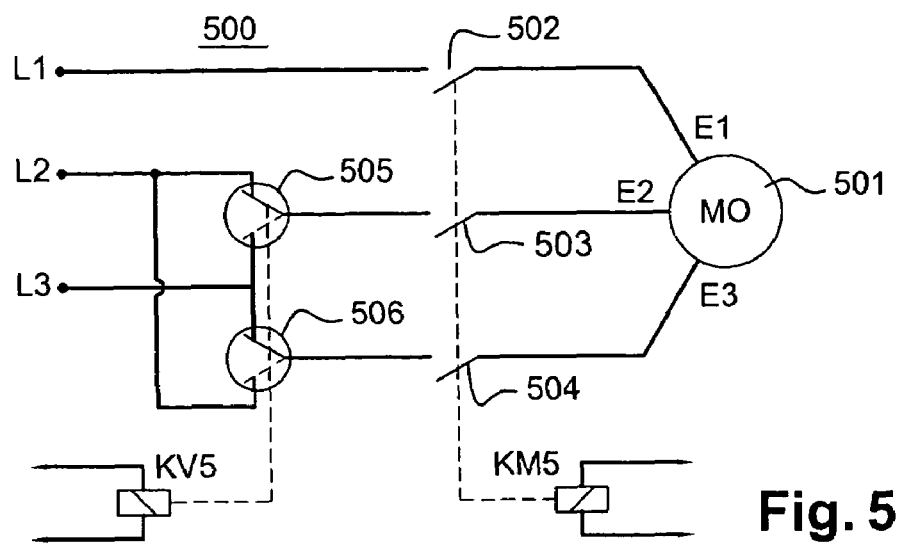
FIG. 5: a diagram of a control circuit of the direction of rotation of a triphase asynchronous motor.

FIG. 5 shows a simplified diagram of a circuit 500 usable with the invention to select the direction of rotation of a triphase asynchronous motor. Such a circuit is on-board in a device according to the invention.

FIG. 5 shows a triphase motor 501 connected to 3 arms L1, L2 and L3. Each arm L1, L2 and L3 comprises, in series with the motor 501, an interrupter 502, 503, and 504 controlled by a relay KM5. The relay KM5 is on the other hand connected to a control circuit driving the motor 501. To select the direction of rotation of the motor 501, FIG. 5 shows that circuit 500 comprises means to exchange two arms at the level of the power supply of the motor. Motor 501 comprises 3 inputs E1, E2 and E3, one for each of the power supply arms. Conventionally, arm Lx is connected to input Ex. In the example of FIG. 5, arm L2 is connected to inputs E2 or E3 via an inverter 505. The arm L3 is connected to inputs E3 or E2 via an inverter 506. The change in the state of inverters 505 and 506 is controlled by relay KV5. In the state of rest of relay KV5, the inverter 505 connects arm L2 to input E2 and inverter 506 connects arm L3 to input E3. In the state of work of relay KV5, the inverter 505 connects arm L3 to input E2 and inverter 506 connects arm L2 to input E3. Relay KV5 is, for example, connected to a pushbutton allowing manual selection of the direction of rotation of the motor 501. In another example, the relay KV5 is connected to a bowl detector allowing the automatic detection of the type of bowl fixed on the chassis of a device according to the invention. In this case, the direction of rotation of the motor is automatically adapted to the type of bowl utilized. Such a detector is, for example, that utilized to prevent operation of the motor and therefore rotation of the tool when the bowl is open.

Figure 6:
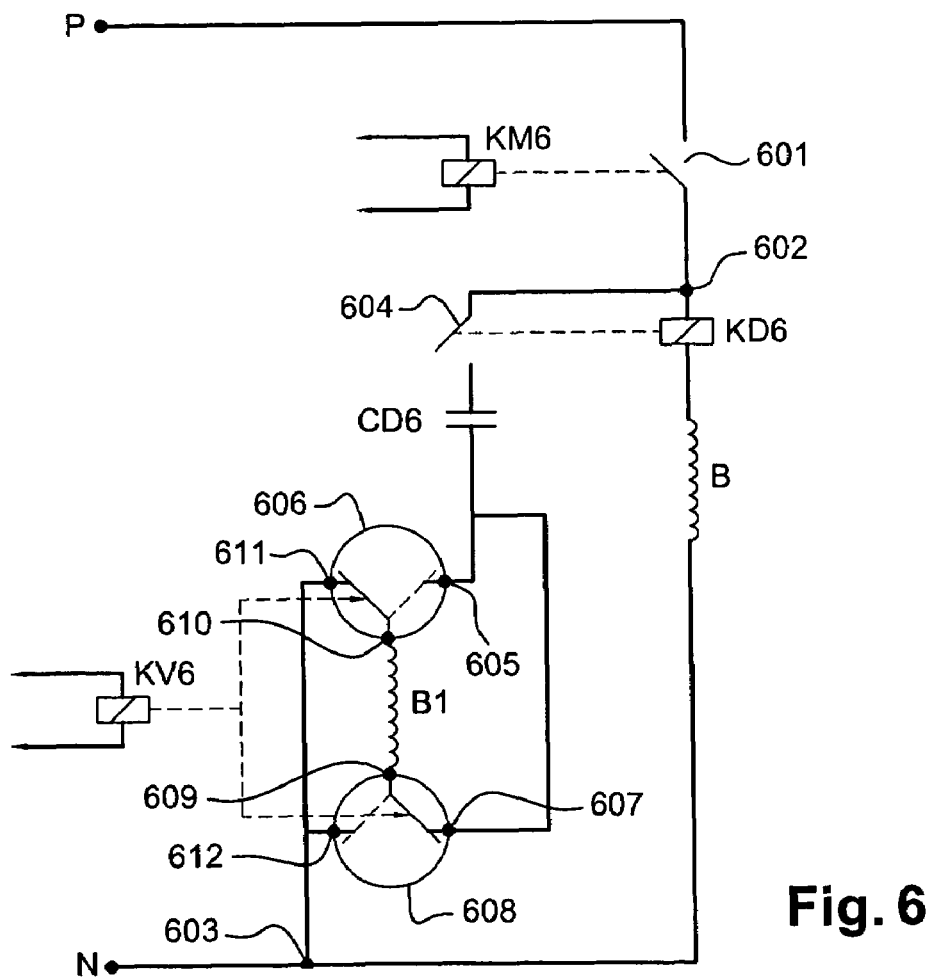
FIG. 6: a diagram of a control circuit of the direction of rotation of a monophase asynchronous motor.

FIG. 6 shows an example of a diagram of a monophase asynchronous motor comprising the main coil winding B, the auxiliary coil winding B1, the start relay KD6 as well as the start capacitor CD6, the assembly connected to a monophase alternating power supply P-N via first, phase P side, an interrupter 601 controlled by a relay KM6, itself connected to a control circuit that may be a pushbutton, for example, and secondly, neutral N side, a node 603. The interrupter 601 is also connected to a node 602 itself connected to the main coil winding B via the coil winding of the start relay KD6. The other extremity of the main coil winding B is connected to node 603. Node 602 is also connected to a side of interrupter 604 controlled by the start relay KD6. The other side of the interrupter 604 is connected to a first terminal of the start capacitor CD6. The second terminal of the capacitor CD6 is connected to a work output 605 of an inverter 606 and to a rest output 607 of an inverter 608. The common point 609 and common point 610 of inverters 608 and 606 respectively are each connected to an output of the auxiliary coil winding B1. The rest output 611 and the work output 612 of inverters 606 and 608 respectively are connected to node 603.

Inverters 606 and 608 are controlled by relay KV6. Therefore, it is relay KV6 which determines the direction of rotation in which the motor will start. When relay KV6 is in a state of rest, the common point 610 situated from a side of the auxiliary coil winding B1 is connected via the rest output 611 and the node 603 to the neutral N side of the alternating power supply, while the common point 609 situated from the other side of the auxiliary coil winding B1 is connected via the rest output 607, the start capacitor CD6, contact 604 and contact 601, to the phase P side of the power supply. Furthermore, when relay KV6 is in a state of work, the common point 610 situated from a side of the auxiliary coil winding B1 is connected via the work output 605, the start capacitor CD6, the contact 604 and the contact 601, to the phase P side of the power supply, while the common point 609 situated from the other side of the auxiliary coil winding B1 is connected via the work output 612 and the node 603 to the neutral N side of the alternating power supply.

From one state to the other of the relay KV6, the direction of current that flows through the auxiliary coil winding B1 is reversed while the direction of current that flows through the main coil winding B remains the same, which allows the motor to be started in one direction or the other.

As for example in FIG. 5, relay KV6 is controlled manually or automatically.

Examples of control circuits presented in FIGS. 5 and 6 are usable with any of the variations of the invention described. Other control circuits are also usable.

The invention claimed is:

1. A device for processing food, the device comprising:
an electric motor including a motor shaft, wherein the motor shaft is rotatable in two directions;
a tool carrying shaft adapted to drive at least one cutting tool, the tool carrying shaft being substantially parallel to the motor shaft; and
a coupling assembly adapted to transmit power generated by the electric motor to the tool carrying shaft, the coupling assembly including two distinct coupling sub-devices, each coupling sub-device having at least one wheel mounted to one of either the motor shaft and the tool carrying shaft via a free wheel rotatable without load in a first direction of rotation, and transmitting a torque by friction in a second, opposite direction of rotation,
wherein only one of the coupling sub-devices transmits the power generated by the electric motor to the tool carrying shaft when the motor shaft is rotating in one of the two directions, and the other of the coupling sub-devices transmits the power generated by the electric motor to the tool carrying shaft when the motor shaft is rotating in the other of the two directions, and
wherein the coupling sub-devices have different coupling ratios such that the tool carrying shaft has a different speed of rotation depending on a direction of rotation of the motor shaft.

2. The device according to claim 1, wherein at least one of the coupling sub-devices comprises toothed wheels for coupling the motor shaft and the tool carrying shaft.

3. The device according to claim 1, wherein at least one of the coupling sub-devices comprises a belt drive for coupling the motor shaft and the tool carrying shaft.

4. The device according to claim 3, wherein the belt is an elastic type belt.

5. The device according to claim 1, wherein one of the coupling sub-devices comprises a loose wheel in the coupling train, thereby allowing the tool carrying shaft to always turn in the same direction independent of a direction of rotation of the motor shaft.

6. The device according to claim 1 wherein the electrical motor is a one-speed asynchronous type motor.

7. The device according to claim 1, wherein the electrical motor is a dual-speed asynchronous type motor.

8. The device according to claim 1, wherein the coupling ratio of the two coupling sub-devices has a ratio between them that is roughly in an interval.

9. The device according to claim 1, wherein a selection of the speed of rotation of the tool carrying shaft is manual.

10. The device according to claim 1, wherein a selection of the speed of rotation of the tool carrying shaft is automatic.

11. The device according to claim 1, wherein the free wheels are mounted on the tool carrying shaft.

* * * * *